US009276936B2

(12) United States Patent
Vishnubhatt et al.

(10) Patent No.: US 9,276,936 B2
(45) Date of Patent: Mar. 1, 2016

(54) TETHERING ENFORCEMENT DEVICE CONTROLLER AND METHODS THEREOF (71) Applicant: Synchronoss Technologies, Inc., Bridgewater, NJ (US)

(72) Inventors: Paddy Vishnubhatt, Los Altos, CA (US); Rajesh Singh, Santa Clara, CA (US); Bala K. Taduri, Fremont, CA (US); Sanida Bratt, Chicago, IL (US); Sumeet Paul, Evanston, IL (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 115 days.

(21) Appl. No.: 13/753,405

(22) Filed: Jan. 29, 2013

(65) Prior Publication Data

US 2014/0215557 A1  Jul. 31, 2014

(51) Int. Cl.
*G06F 7/04* (2006.01)
*H04L 29/06* (2006.01)
*H04W 12/12* (2009.01)

(52) U.S. Cl.
CPC ............ *H04L 63/10* (2013.01); *H04L 63/0227* (2013.01); *H04W 12/12* (2013.01)

(58) Field of Classification Search
CPC .... H04L 63/10; H04L 63/0227; H04W 12/12
USPC .......................................................... 726/3
See application file for complete search history.

(56) References Cited

U.S. PATENT DOCUMENTS

| 8,769,526 | B2* | 7/2014 | Brunsman et al. ............ 717/173 |
| 2011/0136471 | A1 | 6/2011 | Chen et al. | |
| 2012/0110640 | A1* | 5/2012 | Donelson et al. ................. 726/3 |
| 2012/0143978 | A1 | 6/2012 | Coussemaeker et al. | |
| 2012/0240197 | A1* | 9/2012 | Tran et al. .......................... 726/4 |
| 2012/0264375 | A1 | 10/2012 | Shankaranarayanan | |
| 2013/0107783 | A1* | 5/2013 | Shaw ............................ 370/312 |
| 2013/0159503 | A1* | 6/2013 | Erman et al. ................... 709/224 |
| 2013/0254264 | A1* | 9/2013 | Hankinson ........ H04L 29/06047 709/203 |
| 2013/0339942 | A1* | 12/2013 | Brunsman et al. ............. 717/173 |
| 2014/0195654 | A1* | 7/2014 | Kiukkonen et al. ........... 709/220 |

OTHER PUBLICATIONS

EP Search Report mailed Jul. 30, 2014, EP Patent Application No. 14151712.8, filed Jan. 20, 2014, Paddy Vishnubhatt.

\* cited by examiner

*Primary Examiner* — Mohammad W Reza
(74) *Attorney, Agent, or Firm* — Synchronoss Technologies, Inc.; Frederick W. Dour (57) ABSTRACT Embodiments of the present invention are directed to a tethering enforcement device controller and methods thereof. The tethering enforcement device controller (TEDC) is installed on a primary device, or otherwise known as the tethered device. The TEDC is configured to detect, control and block unauthorized or inappropriate tethering with a secondary device, or otherwise known as the tethering device, via either a native or a third-party tethering application, by retrieving a configuration file from a server associated with a wireless carrier. The configuration file typically includes customer profile and currently blacklisted package names of third-party tethering applications. The customer profile typically includes subscription information, including use of tethering services. If the customer is trying to tether and tethering is not allowed, then the TEDC will prevent the secondary device from tethering with the primary device. In some embodiments, the TEDC is an untethering application installed on the primary device.

22 Claims, 5 Drawing Sheets

TETHERING ENFORCEMENT DEVICE CONTROLLER AND METHODS THEREOF

FIELD OF THE INVENTION

The present invention relates to a tethering enforcement device controller and methods thereof.

BACKGROUND OF THE INVENTION

Tethering refers to the coupling of a tethering device, such as a computer, with an Internet-enabled tethering device, such as a smart phone, so that the tethering device is able to use the data plan service of the Internet-enabled device. The tethered device is configured to behave as a modem, providing Internet access to the tethering device. The coupling between the tethering device and the tethered device can be via a data cable, such as a USB cable or a proprietary cable, or be over wireless LAN (Wi-Fi), over Bluetooth or a proprietary communication protocol, to name a few. The tethered device typically includes a tethering application to offer tethered Internet access. A tethering application can be native application provided by the operating system of the tethered device and is supported by OEM (original phone manufacturer).

Figure 1:
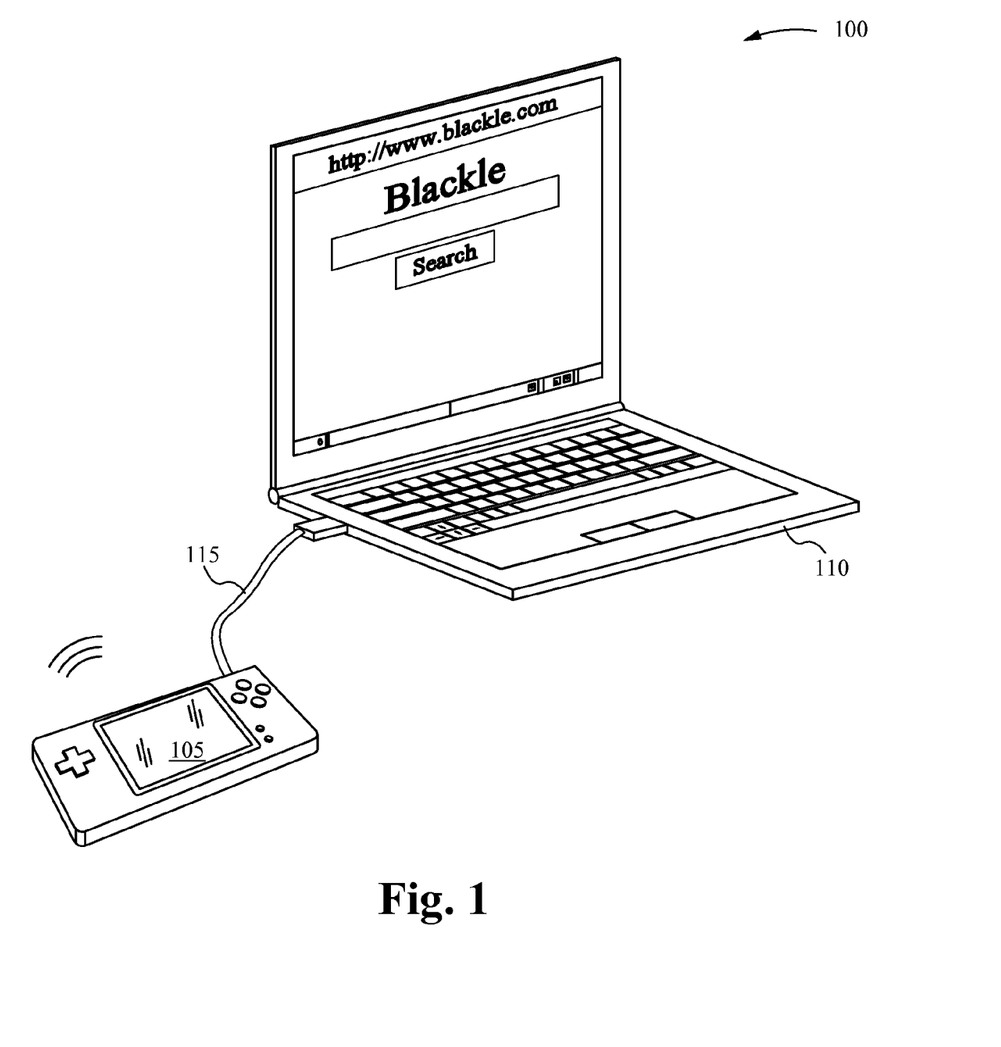
FIG. 1 illustrates an exemplary tethering scenario.

The proliferation of smart phones and the large number of tethering applications currently available have made tethering increasingly popular, especially now that many phone models are able to support third-party tethering applications to couple with tethering devices via USB, or over Bluetooth, or to create Wi-Fi hotspots (which in turn provide service to other devices in the vicinity/network). Tethering applications enable the tethered device, e.g. the smart phone, to share its Internet access anywhere and anytime to other devices which otherwise would require alternate means to access the Internet. FIG. 1 illustrates an exemplary tethering scenario 100, which includes a tethered device 105 and a tethering device 110. The tethered device 105 typically includes a tethering application to allow the sharing of its Internet connection with the tethering device 110. As illustrated in FIG. 1, the tethered device 105 is a smart phone and the tethering device 110 is a computer, and the coupling between tethered device 105 and the tethering device 110 is via a USB cable 115.

The use of smart phones as modems for other devices to access the Internet has caused a serious concern for telecom carriers who are not contracted or paid for use of their mobile networks to be accessed in such a way as to provide Internet services to laptops, computers, tablets or third party user. Wireless operators are struggling to keep up bandwidth usage with demand. Smart phones consume much more bandwidth than do feature phones.

Wireless carriers are working to block unauthorized or inappropriate tethering, but have failed to come up with adequate solutions to completely block unauthorized tethering via either a native tethering application or a third-party tethering application. For example, wireless carriers are working with companies, such as Google, and have been able to block a few third-party tethering applications, by filtering third-party tethering applications from their portal or by blocking downloading of third-party tethering applications from online application market(s). However, there is currently no solution that is able to completely detect, control and block tethering with third-party applications since users are able to either side load third-party applications or get another tethering application from the market that has not yet passed scrutiny of the wireless carriers. The market hosts multiple applications and the number of such applications increases every day.

The present invention addresses at least these limitations in the prior art.

SUMMARY OF THE INVENTION

Embodiments of the present invention are directed to a tethering enforcement device controller and methods thereof. The tethering enforcement device controller (TEDC) is installed on a primary device, or otherwise known as the tethered device. The TEDC is configured to detect, control and block unauthorized or inappropriate tethering with a secondary device, or otherwise known as the tethering device, via either a native or a third-party tethering application, by retrieving a configuration file from a server associated with a wireless carrier. The configuration file typically includes customer profile and currently blacklisted package names of third-party tethering applications. The customer profile typically includes subscription information, including use of tethering services. If the customer is trying to tether and tethering is not allowed, then the TEDC will prevent the secondary device from tethering with the primary device. In some embodiments, the TEDC is an untethering application installed on the primary device.

In one aspect, an apparatus is provided. The apparatus typically includes a non-transitory memory for storing instructions and a processing component coupled to the memory. The processing component is typically configured for processing the instructions.

The instructions are typically for accessing a configuration file from a server. In some embodiments, the configuration file is based on tethering subscription services. In some embodiments, the configuration file includes currently blacklisted package names of third-party tethering applications. In some embodiments, the configuration file is in an XML format.

The instructions are also typically for determining tethering subscription status of the apparatus. The instructions are also typically for, based on the tethering subscription status, blocking tethering with another device.

In some embodiments, the instructions are also for checking whether any of the values in the configuration file corresponds with a running application on the apparatus.

In some embodiments, the instructions are also for verifying that a tethering application has been launched.

In some embodiments, the instructions are also for listening to one or more "broadcasts" by the apparatus upon coupling with the another device.

In some embodiments, the instructions are also for presenting a message regarding the tethering subscription status.

In some embodiments, the instructions are also for sending preliminary data to the server. The preliminary data include identification information of the apparatus.

In some embodiments, the instructions are also for determining all currently live applications running on the apparatus.

In some embodiments, the instructions are invoked while booting the operating system of the apparatus. Alternatively, the instructions are invoked while tethering the apparatus with the another device.

In another aspect, a non-transitory computer-readable medium is provided. The non-transitory computer-readable medium stores instructions that, when executed by a computing device, cause the computing device to perform a method. The method typically includes sending identification information to a server, receiving a customized configuration file based the identification information, determining whether a tethering application is evoked and, based on the determination, checking permissibility of tethering. In some embodiments, checking permissibility of tethering includes referencing the configuration file. The method also includes disconnecting the tethering when the tethering is not permitted and allowing the tethering when the tethering is permitted. In some embodiments, disconnecting the tethering includes prompting a message.

In some embodiments, when the tethering application is a third-party tethering application, determining whether a tethering application is invoked includes listening for one or more broadcasts by the computing device, generating a list of currently running packages on the computing device, and comparing the list of currently running packages with a list of currently, and blacklisted application package names included in the configuration file.

In some embodiments, when the tethering application is a native tethering application, determining whether a tethering application is invoked includes listening for one or more broadcasts by the computing device, and validating the tethering.

In yet another aspect, a tethering system is provided. The tethering system typically includes a network, a server, and a primary device. The server and the primary device are communicatively coupled with the network.

The server typically includes customer profiles and currently blacklisted package names of third-party tethering applications. The server is typically configured to generate personalized configuration files.

The primary device is typically configured to provide identification information to the server and download a customized configuration file from the server. In some embodiments, the customized configuration file includes customer profiles and currently blacklisted package names of third-party tethering applications. In some embodiments, each customer profile includes tethering subscription information regarding the respective customer.

Based on at least the customized configuration file, the primary device is also typically configured to disallow and allow tethering upon detection of such tethering. In some embodiments, disallowing tethering is in response to an improper tethering, and allowing tethering is in response to a proper tether. Tethering can be via USB, Bluetooth or Wi-Fi hotspot.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention are directed to a tethering enforcement device controller and methods thereof. The tethering enforcement device controller (TEDC) is installed on a primary device, or otherwise known as the tethered device. The TEDC is configured to detect, control and block unauthorized or inappropriate tethering with a secondary device, or otherwise known as the tethering device, via either a native or a third-party tethering application, by retrieving a configuration file from a server associated with a wireless carrier. The configuration file typically includes customer profile and currently blacklisted package names of third-party tethering applications. The customer profile typically includes subscription information, including use of tethering services. If the customer is trying to tether and tethering is not allowed, then the TEDC will prevent the secondary device from tethering with the primary device. In some embodiments, the TEDC is an untethering application installed on the primary device.

The TEDC can be installed by the manufacturer of the tethered device or by the wireless carrier and is typically installed prior to the sale of the tethered device to a user. Preferably, the TEDC cannot be uninstalled. The TEDC is typically installed in the tethered device's system space (e.g., system/app folder). The TEDC can be invoked either while booting the operating system of the tethered device or while tethering the tethered device with a tethering device.

Within this present discussion, "user," "subscriber" and "customer" are synonymous and are used interchangeably herein. Also within this discussion, "wireless carrier," "wireless operator" and "service provider" are synonymous and are used interchangeably herein.

Figure 2:
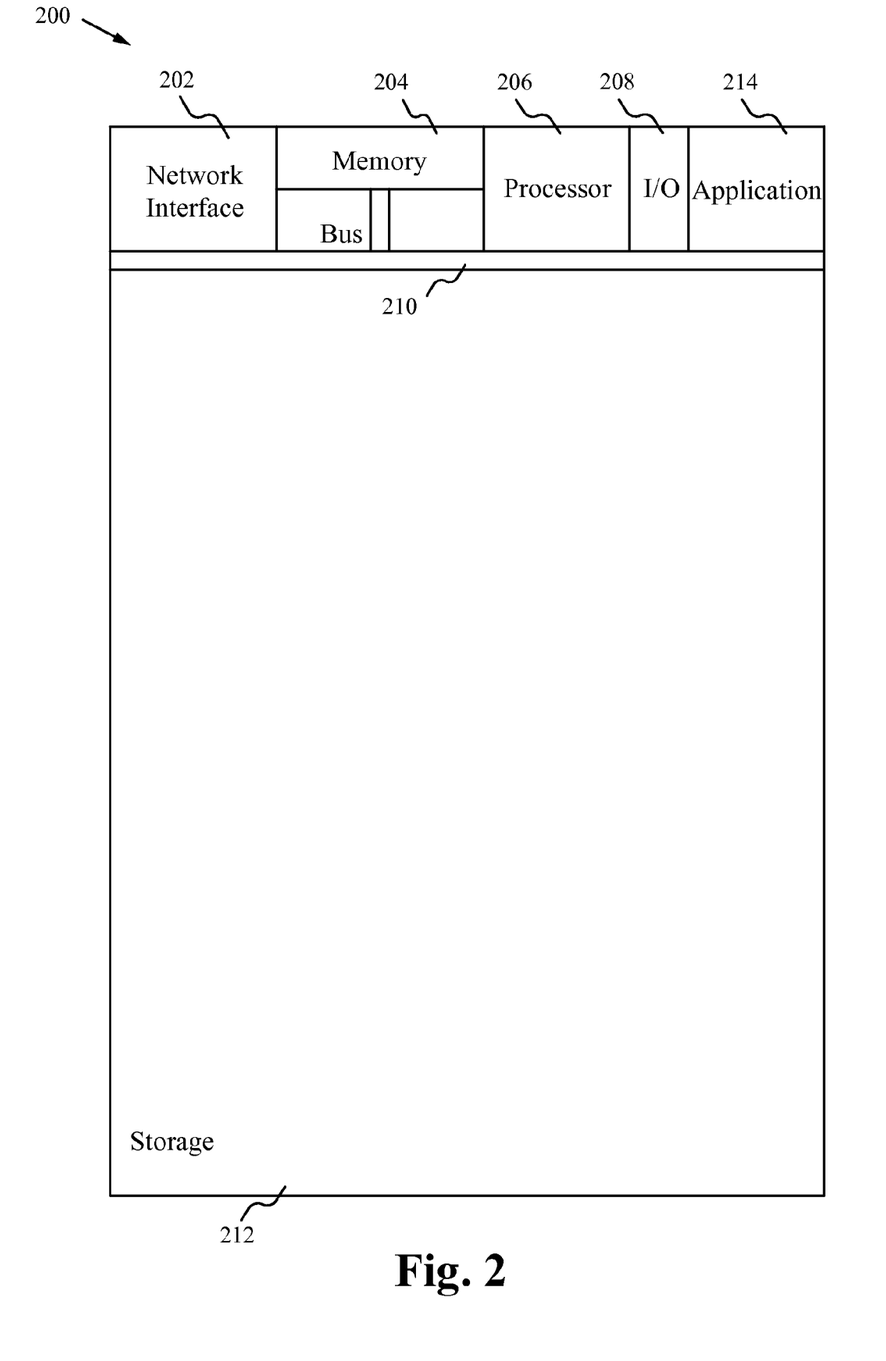
FIG. 2 illustrates a block diagram of an exemplary tethered device in accordance with the present invention.

FIG. 2 illustrates a block diagram of an exemplary tethered device 200 in accordance with the present invention. The tethered device 200 is able to be used to acquire, store, compute, process, communicate and/or display information. The tethered device 200 is also able to access a network, such as the Internet.

In general, a hardware structure suitable for implementing the tethered device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, Blue-Ray®, flash memory card or any other storage device. The tethered device 200 is able to include one or more network interfaces 202 to connect to a cellular network, an Ethernet and/or other type of LAN. The I/O device(s) 208 are able to include one or more of the following: keyboard, mouse, monitor, display, printer, modem, touchscreen, button interface and other devices. In some embodiments, the hardware structure includes multiple processors and other hardware to perform parallel processing. Application(s) 214, including the TEDC and a tethering application, are likely to be stored in the storage device 212 and memory 204 and processed as applications are typically processed. More or fewer components shown in FIG. 2 are able to be included in the computing device 200.

Examples of a suitable tethered device include a smart phone (e.g. an iPhone®), a tablet computer (e.g. an iPad®) or any other suitable computing device capable of receiving and sending data from a network. The tethered device is typically subscribed to Internet services provided by a wireless carrier.

Figure 3:
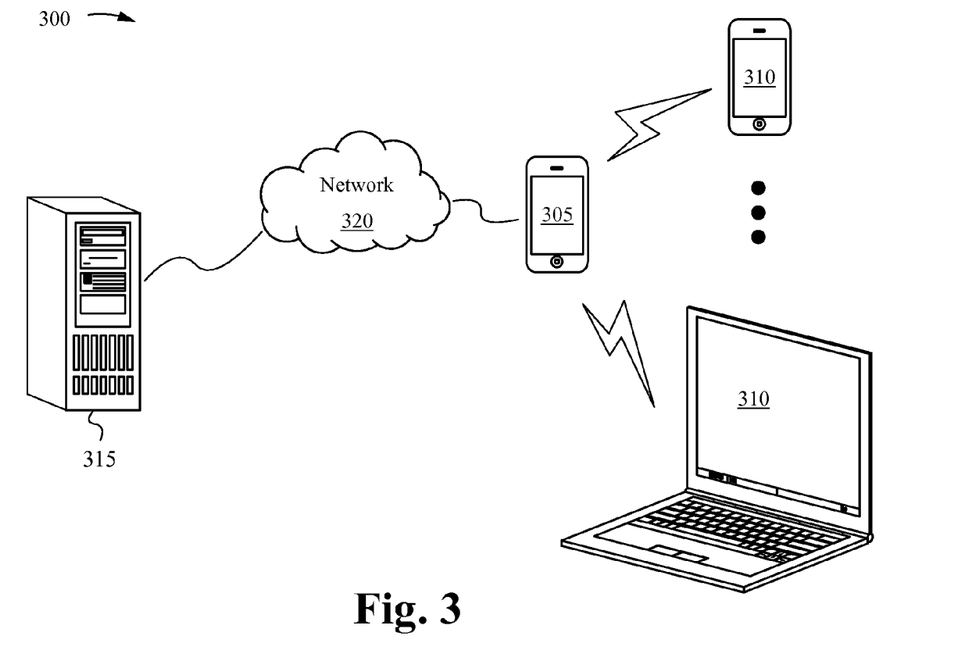
FIG. 3 illustrates an exemplary tethering system in accordance with the present invention.

FIG. 3 illustrates an exemplary tethering system 300 in accordance with the present invention. The tethering system 300 includes a network 320. A tethered device 305, such as the tethered device 200 (FIG. 2), is coupled with the network using the data services provided by the wireless carrier. As shown in FIG. 3, one or more tethering devices 310 are attempting to tether with the tethered device 305. The tethering can be made either with a cable (e.g., USB or serial) or wirelessly through Bluetooth, Wi-Fi or other wireless methods such as infrared or IrDA. A tethering device 310 can be a computer, a laptop, a personal digital assistant device, a smart phone, a tablet, or the like. A tethering device 310 can be of the same model and make as the tethered device 305.

A server(s) 315 associated with the wireless carrier is also coupled with the network 320. The server 315 typically includes customer profiles and currently blacklisted package names of third-party tethering applications. Each customer profile typically includes subscription information of a customer, including use of tethering services. Each customer profile is typically updated by the wireless carrier. A list of currently blacklisted package names of third-party tethering applications can be updated by the wireless carrier and/or independently by others. In some embodiments, the server 325 is configured to prepare appropriate configuration data to be presented to a customer in an XML format or another suitable format.

Assume that the TEDC is already installed and invoked on an Android device and that the user is attempting to use the Android device as the tethered device. For purposes of this description, an exemplary Android device is described. It will be apparent that other devices can be used as the tethered device. Once the TEDC is started and mobile internet is available, as part of the initial sign on with the server, the Android device is configured to send preliminary data, such as device MDN/CTN (mobile device number/cellular telephone number), IMEI (international mobile equipment identity), OS (operating system) version and other manufacturer information, to the server. Upon receiving the preliminary data from the user, the server reviews the preliminary data and determines a tethering category of the user. In some embodiments, the user falls within one of the three tethering categories, which are trial, blocked or allowed. After the initial review by the server, the server generates an XML file for the user. The XML file typically contains personal configuration data according at least to the user's tethering category. In some embodiments, the user receives a new configuration file from the server upon every tethering attempt.

In some embodiments, a trial period is the time period a wireless carrier allows its users to tether and will notify users with special notifications regarding trial subscription statuses. A blocked condition is when, after the completion of the trial period, a user does not subscribe to a tethering service plan and, in which case, upon every subsequent tether attempt, tethering is blocked, with or without notification, until the user subscribes to a tethering service plan. An allowed condition is when a user is subscribed to a tethering service plan or has indicated that the user wishes to subscribe to a tethering service plan after the completion of the trial period.

Figure 4:
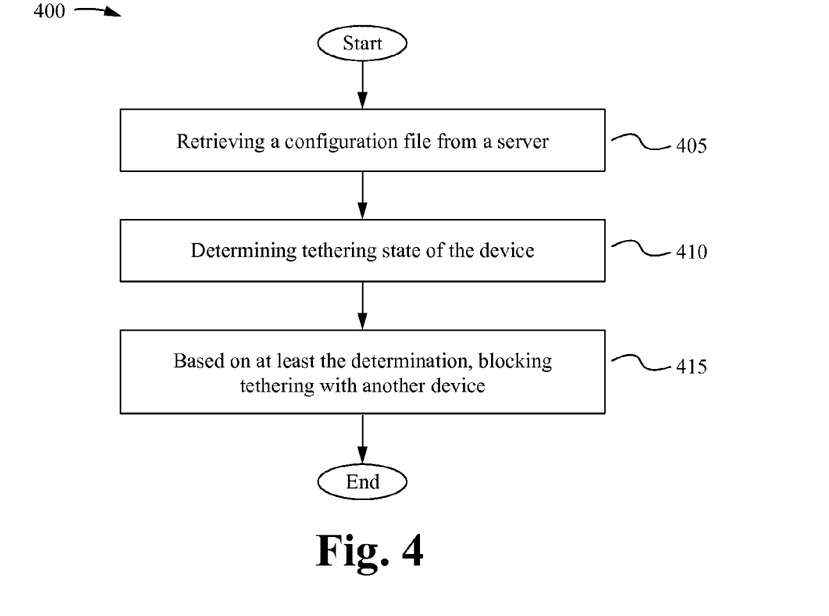
FIG. 4 illustrates a general exemplary tethering enforcement method in accordance with the present invention.

FIG. 4 illustrates a general exemplary tethering enforcement method 400 in accordance with the present invention. The method 400 occurs after the Android device sends the preliminary data to the server. The preliminary data typically includes identifying information of the Android device. In some embodiments, the method 400 occurs after the Android device is coupled with the computer. The method 400 begins at a step 405, where a personalized configuration file is generated by and retrieved from the server. The server is typically associated with the wireless carrier. The configuration file, which includes the user's customer profile, the list of currently blacklisted package names of third-party tethering applications, and/or other information such as prompt messages, is automatically downloaded on to the Android device.

At a step 410, the TEDC determines a tethering subscription status of the Android device using the configuration file. The configuration file typically includes the tethering subscription status.

At a step 415, based on at least the determination, tethering is prevented or blocked as to disallow the user from using the Android device as means to tether the computer to access the Internet without having the proper service contract with the wireless carrier. After the step 420, the method 400 ends.

Figure 5:
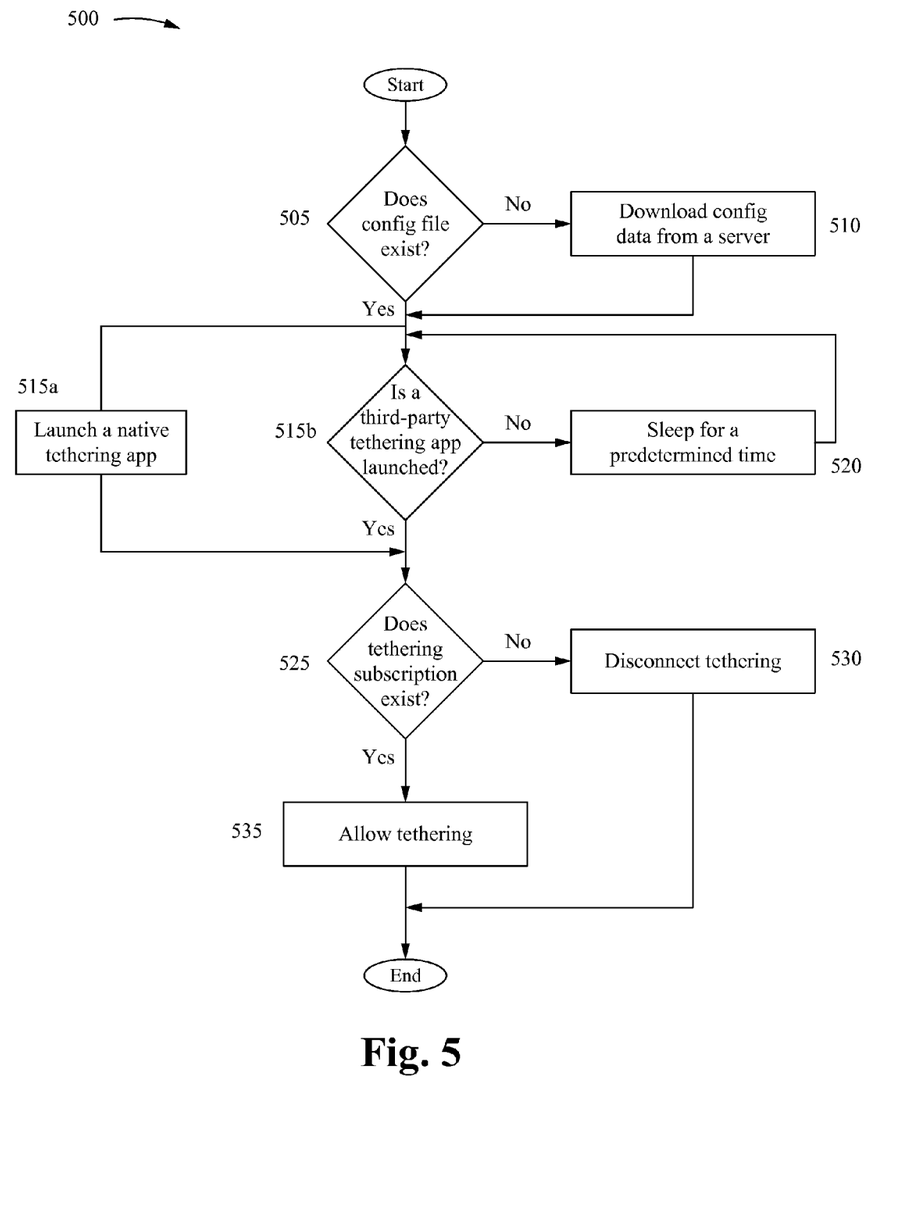
FIG. 5 illustrates a detailed exemplary tethering enforcement method in accordance with the present invention.

FIG. 5 illustrates a detailed exemplary tethering enforcement method 500 in accordance with the present invention. The method 500 occurs after the Android device sends the preliminary data to the server. As discussed above, the preliminary data typically includes identifying information of the Android device. In some embodiments, the method 500 occurs after the Android device is coupled with the computer.

The method 500 begins at a step 505, where it is determined whether a personalized configuration file exists on the Android device. In some embodiments, a configuration file exists only if the configuration file is considered to be a recent configuration file. For example, a configuration file can be considered obsolete and therefore "nonexistent" even if the configuration file had been downloaded from the server on a previous day or an hour before. Even a recently downloaded configuration file can be out of date because a new third-party tethering application could have been added to the market since the configuration file had been downloaded, the user could have added a tethering service plan, or both. In some embodiments, each configuration file has an expiration date/time, after which the configuration file is expired and is considered obsolete.

If it is determined that the configuration file does not "exist" at the step 505, then at a step 510, the configuration file is downloaded from the server on to the Android device. Alternatively, the step 510 is always performed after the computer is coupled with the Android device. In some embodiments, a newer configuration file overrides an older configuration file.

If it is determined that the configuration file does exist at the step 505, then it is determined whether a tethering application has been launched. The user can launch either a native tethering application or a third-party tethering application. As such, the TEDC constantly listens to broadcasts sent by the Android system to determine whether a native tethering application has been launched at step 515a, while it periodically checks the configuration file against all running application on the Android device to determine whether a third-party application has been launched at a step 515b. If there is a "match" at the step 515b, then it is determined that a third party tethering application has been launched. If it is determined that no tethering application is launched at the step 515b, then at a step 520, the TEDC waits for a predetermined amount of time, such as 10 seconds, before returning to the step 515. In some embodiments, the steps 505 and 510 occur after the steps 515 and 520.

Upon determining that a tethering application, whether it be a native tethering application or a third-party tethering application, has been launched at a step 525, it is determined whether a tethering service plan exists based on the user's configuration file. If the user is not subscribed to a tethering service plan, then at a step 530 the TEDC disconnects or disables tethering to prevent the user from using the Android device as means to tether the computer to access the Internet without having the proper service contract with the wireless carrier. The TEDC is able to prompt the user with one or more messages. The method 500 ends after the step 530.

However, if the user is subscribed to a tethering service plan, then at a step 535 the tethering is allowed and the user is able to proceed with the tethering. In some embodiments, if the user is under a trial period, the user is considered to be subscribed to a tethering service plan. The TEDC is able to prompt the user with one or more messages. The method 500 ends after the step 535.

Third-Party Tethering Enforcement Device Controller

Assume the user has downloaded a third-party tethering application, such as a third-party Bluetooth tethering application, a third-party USB tethering application or a third-party generic tethering application, to tether the computer with the Android device. In some embodiments, the TEDC is able to detect and block tethering completely of all third-party tethering applications used to tether the Android device with the computer. When the user couples the Android device with the computer, the TEDC will list all running packages on the Android device, using the "Activity Manager" API in Android. The server associated with the wireless carrier maintains an up-to-date list of names of tethering application packages. This information is typically downloaded as a part of the configuration file on to the Android device when the user boots the Android device, attempts to tether the Android device with the computer, or both.

After downloading the configuration file, the TEDC compares the list of running packages on the Android device with the values in the configuration file. If the list of running packages contains any of the package values in the configuration file, then the TEDC confirms that the user is trying to tether. The TEDC will then intervene and prevent tethering.

Third-Party Bluetooth Tethering.

In some embodiments, when the user couples the Android device with the computer with Bluetooth, the Android system will throw the following broadcast: "android.bluetooth.device.action.ACL_CONNECTED." Once the TEDC receives this broadcast, the TEDC generates a list of currently running packages on the Android device. Once the list of running packages is generated, the TEDC will compare the running packages with the blacklisted application package names. The list of running packages is periodically updated. If a third-party tethering application, such as PDANet, is enabled or launched, then the PDANet application will be included in the list. If there are any blacklisted applications running, then the TEDC prevents the tethering depending on the user's tethering service subscription status.

Figure 6A:
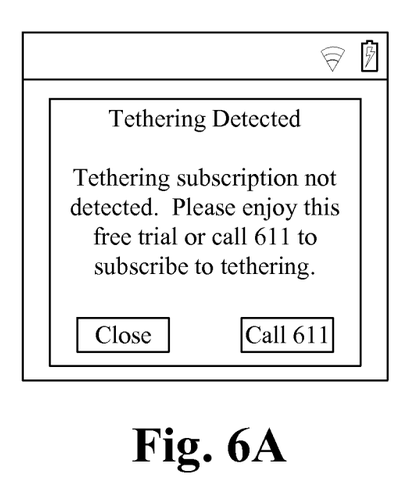
FIG. 6A illustrates an exemplary notification displayed during the trial period in accordance with the present invention.
Figure 6B:
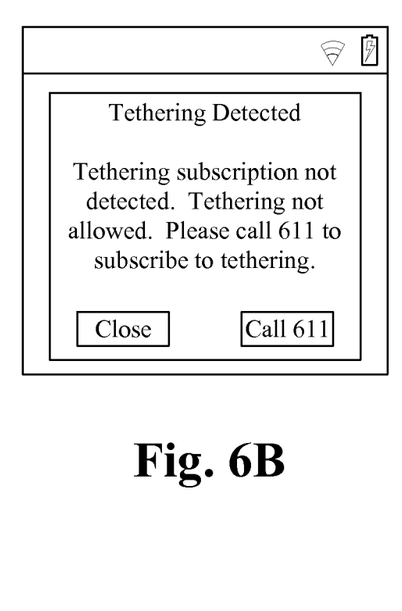
FIG. 6B illustrates an exemplary notification displayed under the blocked category in accordance with the present invention.

In some embodiments, during a trial period, the user will be allowed to tether but will be informed about the trial subscription status. FIG. 6A illustrates an exemplary notification displayed during the trial period in accordance with the present invention. In some embodiments, after the trial period, if the user does not subscribe to a tethering plan, upon every subsequent tether attempt, the TEDC will disconnect the Bluetooth connection by disabling Bluetooth tethering flag to block tethering, with or without a customized notification. FIG. 6B illustrates an exemplary notification displayed under the blocked category in accordance with the present invention. In some embodiments, if the user does subscribe or is subscribed to a tethering plan, then the TEDC will not block tethering, with or without a customized notification.

Third-Party USB Tethering.

In some embodiments, when the user couples the Android device with the computer with USB, the Android system will throw the following broadcasts: "android.net.conn.TETHER_STATE_CHANGED," "android.intent.action.ACTION_POWER_CONNECTED," and "android.intent.action.UMS_CONNECTED." Based on a permutation of these broadcasts or intents, the TEDC will validate computer connection if the difference between time stamps of the intents are less than a predetermined amount of time, such as 1500 milliseconds. Upon a USB connection determination, the TEDC generates a list of currently running packages on the Android device. Once the list of running packages is generated, the TEDC will compare the running packages with the blacklisted application package names. The list of running packages is periodically updated. If a third-party tethering application, such as PDANet, is enabled or launched, then the PDANet application will be included in the list. If there are any blacklisted applications running, then the TEDC prevents the tethering depending on the user's tethering service subscription status.

In some embodiments, during a trial period, the user will be allowed to tether but will be informed about the trial subscription status. (See FIG. 6A.) In some embodiments, after the trial period, if the user does not subscribe to a tethering plan, upon every subsequent tether attempt, the TEDC will disconnect the USB connection by disabling the USB debugging flag and the USB tethering flag to block tethering, with or without a customized notification. (See FIG. 6B.) In some embodiments, if the user does subscribe or is subscribed to a tethering plan, then the TEDC will not block tethering, with or without a customized notification.

Native Tethering Enforcement Device Controller

Now, assume that the user instead enables native tethering, such as native Bluetooth tethering, native USB tethering or portable Wi-Fi to tether the computer with the Android device. Each of these scenarios will now be discussed.

Native Bluetooth Tethering Enforcement Controller.

In some embodiments, when the user tries to tether mobile internet by enabling native Bluetooth tethering, the Android system will throw the following broadcasts: "android.bluetooth.device.action.ACL_CONNECTED," "android.bluetooth.pan.profile.action.CONNECTION_STATE_CHANGED," "android.bluetooth.intent.action.BLUETOOTH_STATE_CHANGED." The TEDC is configured to monitor these broadcasts. In some embodiments, the TEDC will verify tethering with "android.bluetooth.pan.profile.action.CONNECTED" intent. The TEDC will also look at the configuration file. If the configuration file does not exist, then the TEDC will download the configuration file. The TEDC compares the subscription status of the user. If the user is under a trial period, the user will be allowed to tether but will be informed about the user's tethering subscription status. If the user is under the blocked category, then the TEDC will block tethering by disabling the Bluetooth tethering flag, with or without a customized notification. This Bluetooth tethering is disabled without interrupting any other Bluetooth connections, such as a headset or an audio path. If the user is under the allowed category, then the TEDC will not block tethering, with or without a customized notification.

Native USB Tethering Enforcement Controller.

In some embodiments, when the user tries to tether mobile internet by enabling native USB tethering, the Android system will throw the following broadcast: "android.net.conn.TETHER_STATE_CHANGE." The TEDC monitors the broadcast. In some embodiments, the TEDC will verify USB tethering using the Java Reflection API or the like. In some embodiments, USB tethering is validated when the returned string contains "usb01" value or "rndis" value. The TEDC will also look at the configuration file. If the configuration file does not exist, then the TEDC will download the configuration file. The TEDC compares the subscription status of the user. If the user is under a trial period, the user will be allowed to tether but will be informed about the user's tethering subscription status. If the user is under the blocked category, then the TEDC will block tethering by disabling the USB debugging flag and the USB tethering flag, with or without a customized notification. If the user is under the allowed category, then the TEDC will not block tethering, with or without a customized notification.

Portable Wi-Fi Hotspot Tethering Enforcement Device Controller.

In some embodiments, when the user tries to tether mobile internet by enabling portable Wi-Fi hotspot, the Android system will throw the following broadcast: "android.net.conn.TETHER_STATE_CHANGE." The TEDC listens to the broadcast. In some embodiments, the TEDC will verify Wi-Fi hotspot tethering using the Java Reflection API or the like. In some embodiments, Wi-Fi hotspot tethering is validated when the returned string contains "w" value. The TEDC will also look at the configuration file. If the configuration file does not exist, then the TEDC will download the configuration file. The TEDC compares the subscription status of the user. If the user is under a trial period, the user will be allowed to tether but will be informed about the user's tethering subscription status. If the user is under the blocked category, then the TEDC will block tethering by disabling the Wi-Fi hotspot flag, with or without a customized notification. If the user is under the allowed category, then the TEDC will not block tethering, with or without a customized notification.

Advantages

A wireless carrier is able to send a configuration file, in XML format or another suitable format, from the wireless carrier's server to a user's device upon every tethering attempt by a user. This XML file contains values of blacklisted application package names, subscription status of the user (e.g., trial, blocked or allowed), and any customized prompt messages which are to be displayed on the user's device.

The TEDC advantageously allows wireless carriers to inform users about tethering using customized notifications. In some embodiments, wireless carriers are able to notify users whenever the users with unique mobile CTNs and device IMEIs try to tether. In some embodiments, the customized notifications include data usage rate for the current billing cycle and other useful information regarding subscribed data services, tethering services or both.

The TEDC advantageously ensures that use of tethering services are proper and disables improper tethering. In some embodiments, the TEDC efficiently monitors and controls tethering with minimal CPU and battery cycles.

The TEDC advantageously helps wireless carriers alert and get/maintain control of usage of mobile data to, thereby, preserve and control mobile bandwidth.

It should be understood that while the invention has been described relative to specific implementations for the Android operating system, similar implementations can be performed for other smart devices running other operating systems.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system comprising:
   a. a second device including a non-transitory memory; and
   b. a first device including a non-transitory memory for storing instructions that, when executed by the first device, cause the first device to perform a method comprising:
      i. tethering the second device with the first device;
      ii. upon the tethering of the second device with the first device, downloading a customized configuration file from a server onto the first device;
      iii. determining tethering subscription status of the first device, wherein the determination is based on the customized configuration file;
      iv. based on the tethering subscription status, blocking the second device from tethering with the first device;
      v. determining all currently live applications running on the first device, wherein determining all currently live applications running on the first device includes listening to broadcasts thrown by an operating system of the first device; and
      vi. based on the determination, verifying the tethering of the second device with the first device.

2. The system of claim 1, wherein the configuration file includes currently blacklisted package names of third-party tethering applications.

3. The system of claim 1, wherein the configuration file is in an XML format.

4. The system of claim 2, wherein the instructions are also for checking whether any of broadcasts corresponds with the blacklisted package names of third-party tethering applications that are listed in the configuration file.

5. The system of claim 1, wherein the instructions are also for verifying that a tethering application has been launched on the first device.

6. The system of claim 1, wherein the instructions are also for listening to one or more "broadcasts" by the first device upon coupling with the second device.

7. The system of claim 1, wherein the instructions are also for presenting a message on the first device regarding the tethering subscription status when the second device is blocked from tethering with the first device, wherein content of the message is included as part of the configuration file.

8. The system of claim 1, wherein the instructions are also for sending preliminary data to the server from the first device prior to downloading the customized configuration file from the server onto the first device, wherein the preliminary data include identification information of the first device and operating system information of the first device.

9. The system of claim 1, wherein the instructions are invoked while booting the operating system of the first device or while tethering the second device with the first device.

10. The system of claim 7, wherein the configuration file includes data usage rate of the first device for the current billing cycle.

11. The system of claim 1, wherein the instructions implement a tethering enforcement device controller (TEDC), wherein the TEDC cannot be uninstalled.

12. The system of claim 2, wherein the configuration file includes an expiration date/time.

13. A non-transitory computer-readable medium storing instructions that, when executed by a computing device, cause the computing device to perform a method comprising:
  a. sending identification information of the computing device to a server;
  b. receiving from the server a customized configuration file based the identification information;
  c. determining whether a tethering application is evoked on the computing device, wherein determining whether a tethering application is evoked on the computing device includes listening for one or more system broadcasts by the computing device;
  d. based on the determination, checking permissibility of tethering of a subordinate device with the computing device based on the customized configuration file; and
  e. disconnecting the tethering of the subordinate device from the computing device when the tethering is not permitted and allowing the tethering of the subordinate device with the computing device when the tethering is permitted.

14. The non-transitory computer-readable medium of claim 13, wherein when the tethering application is a third-party tethering application, determining whether a tethering application is evoked further comprises:
  a. generating a list of currently running packages on the computing device; and
  b. comparing the list of currently running packages with a list of currently blacklisted application package names included in the configuration file.

15. The non-transitory computer readable medium of claim 13, wherein when the tethering application is a native tethering application, determining whether a tethering application is evoked further comprises validating the tethering of the subordinate device with the computing device.

16. The non-transitory computer readable medium of claim 13, wherein checking permissibility of tethering includes referencing the configuration file.

17. The non-transitory computer readable medium of claim 13, wherein disconnecting the tethering includes prompting a message on the computing device, wherein the message is retrieved from the configuration file.

18. A tethering system comprising:
  a. a network;
  b. a server communicatively coupled with the network, wherein the server includes customer profiles and currently blacklisted package names of third-party tethering applications, and wherein the server is configured to generate personalized configuration files; and
  c. a primary device communicatively coupled with the network, wherein the primary device is configured to:
    i. provide identification information of the primary device to the server;
    ii. download a customized configuration file from the server, wherein the customized configuration file is generated by the server according to the identification information;
    iii. based on at least the customized configuration file, performing one of disallowing and allowing tethering of a secondary device with the primary device upon detection of the tethering;
    iv. determining all currently live applications running on the primary device, wherein determining all currently live applications running on the primary device includes listening to broadcasts thrown by an operating system of the primary device; and
    v. based on the determination, verifying the tethering of the secondary device with the primary device.

19. The tethering system of claim 18, wherein the tethering is via one of USB, Bluetooth and Wi-Fi hotspot.

20. The tethering system of claim 18, wherein the customized configuration file includes customer profiles and currently blacklisted package names of third-party tethering applications, and wherein each customer profile includes tethering subscription information regarding a customer.

21. The tethering system of claim 18, wherein disallowing tethering is in response to an improper tethering, and allowing tethering is in response to a proper tether.

22. The system of claim 12, wherein the expiration date/time has passed, the configuration file becomes invalid and a subsequent configuration file is downloaded to override the invalid configuration file.

* * * * *